United States Patent
Shaffer et al.

(10) Patent No.: US 8,236,903 B2
(45) Date of Patent: Aug. 7, 2012

(54) TRANSITION METAL CROSSLINKING OF ACID-CONTAINING POLYMERS

(76) Inventors: Jay M. Shaffer, New Berlin, WI (US); Tracy L. Eifolla, Oconomowoc, WI (US)

( * ) Notice: Subject to any disclaimer, the term of this patent is extended or adjusted under 35 U.S.C. 154(b) by 874 days.

(21) Appl. No.: 12/186,627

(22) Filed: Aug. 6, 2008

(65) Prior Publication Data

US 2009/0043043 A1    Feb. 12, 2009

Related U.S. Application Data

(60) Provisional application No. 60/954,457, filed on Aug. 7, 2007.

(51) Int. Cl.
    *C08F 8/42*      (2006.01)
    *C08C 19/26*      (2006.01)

(52) U.S. Cl. .......... 525/330.2; 525/329.7; 525/360; 525/362; 525/363; 525/364; 525/370; 525/371; 525/372; 525/373

(58) Field of Classification Search ......... 525/329.7, 525/330.2, 360, 362, 363, 364, 370, 371, 525/372, 373
See application file for complete search history.

(56) References Cited

U.S. PATENT DOCUMENTS

| | | | |
|---|---|---|---|
| 2,754,280 A * | 7/1956 | Brown et al. | 524/853 |
| 2,795,564 A | 6/1957 | Conn et al. | |
| 3,308,078 A | 3/1967 | Rogers et al. | |
| 3,328,325 A | 6/1967 | Zdanowski | |
| 3,467,610 A | 9/1969 | Fiarman et al. | |
| 3,554,790 A | 1/1971 | Gehman et al. | |
| 4,150,005 A | 4/1979 | Gehman et al. | |
| 4,517,330 A | 5/1985 | Zdanowski et al. | |
| 4,690,981 A | 9/1987 | Statz | |
| 4,771,105 A | 9/1988 | Shirai et al. | |
| 4,826,907 A | 5/1989 | Murao et al. | |
| 5,149,745 A | 9/1992 | Owens et al. | |
| 5,319,018 A | 6/1994 | Owens et al. | |
| 2004/0097644 A1 * | 5/2004 | Katou et al. | 524/800 |
| 2005/0288411 A1 * | 12/2005 | Eichman et al. | 524/376 |

OTHER PUBLICATIONS http://en.wikipedia.org/wiki/Transition_metal; Aug. 2011.*

* cited by examiner

*Primary Examiner* — Roberto Rabago
(74) *Attorney, Agent, or Firm* — Boyle Fredrickson S.C.

(57) ABSTRACT

An acid-functional polymer is reacted with a transition metal compound having an average particle size small enough to react with the polymer at a temperature below the glass transition temperature of the polymer, e.g., at room temperature, to produce cross-linked polymer. The process produces a liquid polymer product that dries to a cross-linked film without the required presence of volatile ligands. Improved coatings such as floor polishes that can be formed from these cross-linked polymers are also disclosed.

7 Claims, No Drawings

TRANSITION METAL CROSSLINKING OF ACID-CONTAINING POLYMERS

CROSS-REFERENCE TO RELATED APPLICATION

This application claims priority from U.S. Provisional Application Ser. No. 60/954,457, filed Aug. 7, 2007, which is expressly incorporated herein by reference in its entirety.

FIELD OF THE INVENTION

The present invention relates to coating compositions formed of acid containing polymer dispersions cross-linked with transitional metal compounds that form a liquid polymer product capable of drying to form a cross-linked polymer film.

BACKGROUND OF THE INVENTION

It has been known in the art to add stable complex salts of transition metals such as zinc to emulsions and dispersions of acid containing polymers, such as in U.S. Pat. Nos. 3,308,078; 3,328,325; 3,467,610; 3,554,790; 4,150,005; and 4,517,330, which are each incorporated herein by reference in their entireties.

In practicing this chemistry, complex salts are formed from simple salt or oxides of transition metals with amines or other simple complexing ligands.

Since each of the steps in the formation of the complex from the free (or hydrated) metal ion is reversible and runs to equilibrium, the process must be forced to completion (tetradentate ligand complex) by mass action, charging an excess of the ligand species. The complexing agent must be a simple ligand, to avoid the formation of very stable complex structures that will not donate metals to the acidic polymer.

The metal complex is formed before addition to the polymer to increase the ion complex surface area, decreasing the charge per unit area, so that the acid containing polymer is stable in the presence of the multivalent ion. The instability of acid containing polymers to multivalent ions is well known and, in fact, they be are commonly used to flocculate and precipitate polymers from waste streams ($Fe^{++}$, $Fe^{+++}$ and $Al^{+++}$ salts are most commonly used). The reduced charge density of the complex multivalent salt provides only minimal disruption of the polar double layer thought to be responsible for polymer emulsion stability.

When the complex salt solution is added to the acidic emulsion polymer, the salt undergoes counterion exchange. Most commonly, the complex multivalent cations are prepared as carbonate, bicarbonate, or acetate salts. As this technology is generally understood, the only limitation of the anion of the salt is that it be a stronger base than the anion of the pendant polymeric acid. If weaker base anions, such as chloride, etc., are used as the salt, crosslinking apparently does not occur because the process of counterion exchange does not happen; the weaker base anions do not displace the anion of the polymeric acid.

The conjugate acid of the anion of the stable metal complex must be either volatile or unstable. For instance, acetic acid, the conjugate acid of acetate anion, is volatile, and carbonic acid, the conjugate acid of both bicarbonate and carbonate anions, is unstable (spontaneously decomposing to carbon dioxide and water). In practice, the evolution of volatile conjugate acid, or the volatile by-products of the decomposition of the unstable conjugate acid is a processing problem encountered during this crosslinking reaction.

The complex cation, in close association with polymer carboxylate anions provides latent crosslinking of the polymer (Maintenance Chemical Specialties, by Walter J. Hackett. Chemical Publishing Co., Inc. N.Y., 1972. pp.9-13). This crosslinking has been referred to as latent because it occurs only after the volatile (amine) ligand is released from the metal during the polymer film formation stages.

The latent crosslinking may be due to the formation of insoluble metal-polymeric carboxylate salts, or the formation of polymeric carboxyl complexes with the metals.

Complexed transition metal salt latent crosslinking has thus enabled the art to produce polymers that will crosslink in a coating upon drying, without interfering with the film formation process. Since the final cross-linked polymer effectively has the pendant acid functionality tied up in insoluble acid-metal salts or complexes, metal cross-linked polymers have improved resistance to alkaline materials, such as detergents or cleaning solutions.

The addition of low levels (typically 1 to 3%) of ammonia or other amine to a cleaner solution is believed to effectively reverse the crosslinking process. The free metal-amine complex is re-formed, thus freeing the polymeric acid functionality which may then be attacked by simple alkaline materials. These amine-containing cleaner solutions are known as strippers, since they effectively allow for the removal of the previously cross-linked films.

One problem of this chemistry has been that application of multiple coats of compositions containing these metal salt complexes can sometimes prove difficult because the new wet coat of polymer composition contains a high concentration of the complexing amine liqand. This high concentration of free amine, and the amine ligand released from the complex, act as a stripper on the previously applied under-coat causing redispersion of the under-coat, drag in the application of the top coat, whitening and ghosting of the coating, and general disruption of the recoating process known as poor recoatability. These difficulties are particularly noted when coating formulations are applied rapidly, as is common practice in industrial applications.

Though transition metal salt latent crosslinking of acid-containing emulsion polymers has provided many improvements in dry film properties, the high ammonia content of transition metal complex formulations is disadvantageous in that it is mildly toxic and highly odoriferous. The volatile ligands lead to difficulties in handling, formulating, and use of the emulsion polymers produced by this technology.

In other prior art which achieves a partial solution to this problem, e.g., U.S. Pat. Nos. 5,149,745 and 5,319,018, each of which are expressly incorporated by reference herein in their entirety, a polymer composition of this type is formed by heating the polymer dispersion to a temperature above the glass transition temperature of the polymer and maintaining that temperature as a low or ammonia free metal cross-linking agent is added to the dispersion. However, it is necessary to heat the dispersion to a temperature above the glass transition temperature for the polymer to achieve the desired cross-linking of the polymer. In these references, it is also disclosed that if the metal compound is added in finely divided form the reaction will proceed more rapidly. Pre-dispersing the finely divided metal compound will produce an even more rapid reaction. But, generally the extent or effectiveness of the reaction is not changed by these modifications, only the speed of the reaction.

As a result, it is desirable to develop a transition metal cross-linking composition that is effective in cross-linking polymers, but without the need for heating the polymer and the cross-linking composition to temperatures exceeding the glass transition temperatures of the polymer in order to achieve the desired levels of cross-linking.

SUMMARY OF THE INVENTION

According to one aspect of the present invention, a composition for producing a cross-linked polymer film is provided that can be formed at room temperatures, without the need for any addition heat to be added to the composition. The composition is formed by combining an acid-functional polymer with a transition metal compound having an average particle size sufficiently small to be able to react with the polymer at a temperature below the glass transition temperature ($T_g$) of the polymer. The small size of the particles of the transition metal compound allows the reaction with the acid-functional polymer to take place at the temperatures below the glass transition temperature of the polymer, such as at room temperature, that do not require much if any additional energy to be supplied to the transition metal compound/polymer mixture. During the reaction, the transition metal compound particles are maintained in contact with the polymer for a time sufficient to allow the reaction to occur.

According to another aspect of the present invention, the films produced from the polymer compositions produced according to the invention exhibit the advantages of the cross-linked, detergent resistant films produced through latent metal salt crosslinking without the toxicity, odor, or application problems associated with the use of volatile ligands, such as amines, that have previously been employed in crosslinking acid-containing polymers. Moreover, the process of the invention appears to produce a more complete crosslinking of the acid functionality of the polymer than latent metal salt crosslinking as indicated by the ability to produce higher stoichiometric levels of reaction with the acid functionality of the polymer when practicing the invention.

Numerous other aspects, features and advantages of the present invention will be made apparent from the following detailed description.

DETAILED DESCRIPTION OF THE INVENTION

I. Polymers

Polymeric materials must meet two criteria to be useful in this invention. They must be dissolved or dispersed in water and must contain pendant acid functionality. Polymers that contain acid functionality only as termini or end groups do not produce the desired cross-linked polymer and film properties.

The acid functionality may be incorporated in the polymer by known means using an effective amount, preferably from 4 to 90% by weight of the total monomers of acidic monomers. Examples of acidic monomers are ethylenically unsaturated acid monomers, such as acrylic acid, methacrylic acid, maleic acid, itaconic acid, maleic anhydride, vinyl phenol and mixtures thereof.

Other monomers in the polymer preparation are selected to produce the desired end use and application properties sought and include the polymerizable comonomers which form soft polymers in the presence of free radical catalysts and those that produce hard polymers in the presence of free radical catalysts. Examples of comonomers which polymerize to form soft polymers include primary and secondary alkyl acrylate, with alkyl substituents up to eighteen or more carbon atoms, primary or secondary alkyl methacrylates with alkyl substituents of five to eighteen or more carbon atoms, or other ethylenically-unsaturated compounds which are polymerizable with free radical catalysts to form soft solid polymers, including vinyl esters of saturated monocarboxylic acids of more than two carbon atoms. The preferred ethylenically unsaturated compounds are the stated acrylates, itaconates, and methacrylates, and of these the most preferred esters are those with alkyl groups of not more than 8 carbon atoms.

The preferred monomers which by themselves yield soft polymers may be summarized by the formula $H_2C=CR'-CO-O-R^x$, wherein R' is hydrogen or a methyl group and, when R' is methyl $R^x$ represents a primary or secondary alkyl group of 5 to 18 carbon atoms, and when R' is hydrogen, $R^x$ represents an alkyl group of not over 18 carbon atoms, preferably of 2 to 8 carbon atoms and more preferably 2 to 4 carbon atoms.

Typical compounds that can be used in the present invention are ethyl acrylate, proply acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexylacrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylhexyl methacrylate, 2-ethylbutyl methacrylate, octyl methacrylate, 3,5,5-trimethylhexyl methacrylate, decyl methacrylate, dodecyl methacrylate, octadecyl methacrylate, and those with substituted alkyl groups such as butoxylethyl acrylate or methacrylate.

Another group of monomers which by themselves yield soft polymers are butadiene, chloroprene, isobutene, and isoprene. These are monomers commonly used in rubber latices along with a hard monomer also useful in this invention, such as acrylonitrile, styrene, and other hard monomers as given above. The olefin monomers, particularly ethylene and propylene, are also suitable soft monomers.

Examples of polymerizable ethylenically unsaturated monomers which by themselves form hard polymers, are alkyl methacrylates having alkyl groups of not more than four carbon atoms and alkyl acrylates having alkyl groups of not more than 2 carbon atoms also tert-amyl methacrylate, ter-butyl or tert-amyl acrylate, cyclohexyl, benzyl or isobornyl acrylate or methacrylate, acrylonitrile, or methacrylonitrile, these constituting a preferred group of the compounds forming hard polymers. Styrene, vinyl chloride, chloride, chlorostyrene, vinyl acetate and a-methylstyrene, which also form hard polymers, may be used.

Preferred monomers, which by themselves form hard polymers, may be summarized by the formula $H_2C=CR'-X$, wherein R' is hydrogen or a methyl group and wherein X represents one of the groups —CN, phenyl, methylphenyl, and ester-forming groups, —COOR", wherein R" is cyclohexyl or methyl or ethyl or a tert-alkyl group of four to five carbon atoms, or, when R' is methyl, an alkyl group of two to four carbon atoms. Some typical examples of these have already been named. Other specific compounds are methyl methacrylate, ethyl methacrylate, propyl methacrylate, isoproply methacrylate, isobutyl methacrylate, n-butyl methacrylate, sec-butyl methacrylate, and tert-butyl methacrylate. Acrylamide and methacrylamide may also be used as hardening components of the copolymer.

A further class of polymers of this invention are polymers of the esters of vinyl alcohol such as vinyl formate, vinyl acetate, vinyl propionate, vinyl butyrate and vinyl versitate. Preferred is poly(vinyl acetate) and copolymers of vinyl acetate with one or more of the following monomers: vinyl chloride, vinylidene chloride, styrene, vinyl toluene, acrylonitrile, methacrylonitrile, acrylate or methacrylate esters, and the functional group containing monomers given above.

These polymers can be prepared, for example by emulsion copolymerization of the several monomers in the proper proportions. Conventional emulsion polymerization techniques are described in U.S. Pat. Nos. 2,754,280 and 2,795,564. Thus the monomers may be emulsified with an anionic, a cationic, or a nonionic dispersing agent, about 0.5% to 10% thereof being used on the weight of total monomers. When water-soluble monomers are used, the dispersing agent serves to emulsify the other, less soluble monomers. A polymerization initiator of the free radical type, such as ammonium or potassium persulfate, may be used alone or in conjunction with an accelerator, such as potassium metabisulfite, or sodium thiosulfate. The initiator and accelerator, commonly referred to as catalyst, may be used in proportions of ½ to 2% each based on the weight of monomers to be copolymerized. The polymerization temperature may be from room temperature to 90.degree. C. or more as is conventional.

Examples of emulsifiers or soaps suited to this polymerization process include alkali metal and ammonium salts of alkyl, aryl, alkaryl, and aralkyl sulfonates, sulfates, and polyether sulfates; the corresponding phosphates and phosphonates; and ethoxylated fatty acids, alcohols, amines, amides, and alkyl phenols.

Chain transfer agents, including mercaptans, polymercaptans, and polyhalogen compounds, are often desirable in the polymerization mix.

Staged or sequential copolymers can also be cross-linked according to the invention. Particularly useful first stage copolymers are ethylene/ethylacrylate copolymers and ethylene/vinyl acetate copolymers containing added hydrophilic monomer.

For the formation of various products from the polymers that are cross-linked using the transition metal compounds of the present invention, such as floor finishes, a particularly preferred class or classes of polymers are formed from acid functional styrene/acrylic copolymers which have a range of glass transition temperatures from about 100° F. to 200° F.

II. Metals

All of the transition metals are capable of forming polymeric crosslinks, though care must be exercised when considering the use of arsenic, mercury, cobalt, copper, lead, cadmium, nickel and chromium for a specific application due to high cost, toxicity, or the production of a color in the polymeric film. Certain transition metals such as aluminum, tungsten, and tin that could not be used in latent metal salt crosslinking because of their inability to form a stable amine complex, are useful in the present invention. Combinations of transition metals may be effectively used. The divalent alkaline metals are generally not effective as crosslinking agents.

Regardless of the particular transition metal compound that is used, the essential aspect of the compound is that the average particle size of the compound be sufficiently small to enable the transition metal compound to react with the polymer at a temperature at or below the $T_g$ of the polymer, and optionally without any additional heat required to be applied to the composition including the polymer and the transition metal compound, i.e., at room temperature. This is in direct opposition to the findings in the U.S. Pat. Nos. 5,149,745 and 5,319,018 where no observed reactions between the transition metal compounds and the polymers took place at temperatures below the glass transition temperature of the polymers. To achieve these reactions at the low temperatures not previously though or observed to be possible, the average particle size for the particles of the transition metal compound is preferably less than 300 nm, more preferably less than 150 nm and most preferably less than 100 nm. Due to the very small particle size, the reaction between the polymer dispersion and the transition metal compound can occur at temperatures less than the $T_g$ of the polymer, such as at or below room temperature. The reason for this is that the small particle size for the transition metal compound can intermix freely within the polymer dispersion without the need for the input of any external energy, such as by heating the dispersion. Thus, the ability of the transition metal compound to readily intermix with the polymer negates the need for any additional energy input to initiate the reaction between the transition metal compound and the acid-functional group on the polymers, The preferred metals, based on criteria of low cost, low toxicity, and low color in the cross-linked film, include zinc, aluminum, tin, tungsten and zirconium. Zinc and aluminum are particularly preferred. Useful compounds of the transition metals include the oxide, hydroxide, carbonate and acetate forms of the transition metals, and usually the basic acetate form of these transition metals.

Non-water soluble transition metal salts are preferably utilized. This is because, when used in emulsion or dispersions of acid-containing polymer, the metal compounds must be relatively insoluble since even moderately soluble salts (i.e. $\geq 0.4\%$ in water at 60.degree. C.) can produce excessively high levels of multivalent cations in solution. High levels of multivalent cations can cause dispersions or emulsions of acid-containing polymer to precipitate or sediment from the dispersion or emulsion because of the polymer's multivalent cation instability (the double layer is believed to be disrupted by multivalent cations). This requirement for a low solubility transition metal compound does not apply to acid-containing polymers in aqueous solution, but only to aqueous dispersions and emulsions of acid-containing polymers.

Reaction with Transition Metal Compound

In one embodiment, the process of the invention is practiced by charging a reaction zone with an acid-containing polymer in dispersion or solution, which can be formed of any suitable organic solvent, but is preferably water, and charging to this, while the polymer is below the glass transition temperature of the polymer, an appropriate amount of transition metal compound. As stated previously, this transition metal compound is formed to have a particle size that is able to react with the polymer at or below the glass transition temperature of the polymer, and preferably less than 300 nanometers (nm), more preferably less than 150 nm, and most preferably less than 100 nm. The compound is maintained in contact with the acid-containing polymer, at or below the glass transition temperature, until the reaction is completed. The point of completion of the reaction is indicated by an observable reduction in opacity and an increase in the pH of the reaction mixture. The reaction zone can be any suitable reaction vessel or area in a reactor. The transfer of materials from one vessel or portion of a reactor, if performed during the reaction, will bring the additional vessel or area under the team reaction zone. The process may be practiced as a batch, continuous or semi-continuous process.

The maximum amount of transition metal compound for use in dispersion or emulsion system can be determined by reference to the amount (equivalence) of pendant acid functionally in the polymer and then selecting the desired amount of metal based on the known valence of the metal ion. Divalent metal ions will stoichiometrically react with two equivalents of acid per mole of metal salt, and trivalent metal ions will react with three equivalents of acid. Monovalent metal salts will not effectively crosslink the polymer by this technique.

It is generally desirable to use less than a full stoichiometric equivalent of the metal to reduce the chance of accidentally charging more of the metal than the reaction will consume. The presence of an unreacted excess could decrease the emulsion stability or produce a residue of metal compound in the resulting film which is undesired in some uses of the reaction product.

If the acid-containing polymer is prepared as an aqueous solution polymer with moderate to low solubility it is beneficial to add the transition metal compound in the form of particles of the transition metal compound that are less than 300 nanometers (nm), more preferably less than 150 nm, and most preferably less than 100 nm in size or as an aqueous dispersion including the transition metal particles of this size. Doing so avoids the result in which the particles of metal compound are coated with a layer of insoluble polymeric metal salt which can effectively retard further reaction of the polymer with the transition metal compound particles.

Water insoluble acid-containing polymer dispersions must be maintained in the acid form before addition of the insoluble metal compound. Partial neutralization of the polymer (2-20%) may be carried out to impart polymer emulsion stability or polymer solubility, but more extensive neutralization (for example $\geq 50\%$) retards the speed of the reaction of polymer with metal compound.

Water soluble acid-containing polymers must be neutralized to an extent sufficient to maintain their water solubility during reaction with the metal compounds. Polymers of low solubility will require a higher degree of neutralization to maintain solubility during the reaction, and those of higher solubility will require a lesser degree of neutralization. However, the higher the degree of neutralization of the polymeric acid functionality, the slower will be the reaction with the transition metal compound.

In some uses of the polymer product of the invention, such as floor polish vehicles, it is necessary that the polymer emulsion have a pH greater than 7.0 so that it will allow other formulation ingredients, such as anionic fluorocarbon surfactant wetting agents, to function in their intended manner. It is preferred that this pH adjustment be made after the polymer emulsion has been reacted with the insoluble metal compound so that the majority of the polymeric acid functionality remains in the acid form and the rate of the reaction is not significantly slowed. In some applications of emulsion polymer product it is desirable to neutralize the polymer or formulation with a volatile base, such as ammonia or other amine. It is preferred that any such basification be carried out after the polymer has been reacted with the insoluble transition metal compound. The invention can provide more highly cross-linked polymers and formulations which are stabilized by neutralization with base but exhibit a much lower pH than is possible with amine-complex crosslinking. The mixed metal crosslinking technology disclosed in U.S. Pat. No. 4,517,330 may be practiced along with the process of the invention. It is most desirable to practice this technology by adding the basic alkali metal salt after the polymer has been reacted with the transition metal compound, in order to provide acceptable reaction rates. A fraction of the basic alkaline metal salt may be used to prebasify a small percentage of the polymeric acid functionality to provide enhanced polymer stability during the reaction, as has been described above.

After completion of the reaction, in those reactions where a transition metal compound has been utilized that has a larger average particle size, any precipitate that has formed within the final polymer composition can then be filtered from the composition, to enable the final cross-linked polymer composition to be put to its intended use.

The polymer products of the invention are suitable for multiple purposes, and are particularly suited to uses that must exhibit resistance to chemical or physical challenges. These uses include coatings such as paints, polishes, particularly floor polishes, industrial and maintenance coatings.

The following examples are provided to further illustrate the practice of aspects of the invention. These examples should not be read as limiting the scope of the invention which is described in the specification and claims. Unless otherwise stated parts are parts by weight and percentages are percentages by weight.

Example 1

Reaction With 50% of Theoretical Stoichiometry of Zinc Oxide Based on Polymer Acid Functionality Monomer Mixture Preparation A suitable monomer mixture for use in forming the acid-functional polymer used to form the liquid polymer products of the present invention is prepared in a suitable mixing vessel by combining the monomers shown in Table 1:

TABLE 1

| Monomer | Weight (grams) | Weight Percent of Total Monomer Mixture |
|---|---|---|
| butyl acrylate (BA) | 85.5 | 22.8 |
| styrene | 111.6 | 29.7 |
| methacrylic acid (MAA) | 37.5 | 10.0 |
| methyl methacrylate (MMA) | 140.7 | 37.5 |

Polymer Preparation

To form this monomer mixture into the acid-functional polymer, in a suitable reaction vessel equipped with a thermometer, condenser, and stirrer, a solution of 580 grams of deionized (DI) water, 15.0 grams of a 60% SLES sodium lauryl ether sulfate (SLES) solution and 6.0 grams of a secondary alcohol (C12-15) ethoxylate (3 moles) is formed in the vessel and heated to 150° F. Next, 20% of the above monomer mixture is added to the reaction vessel followed by an ammonia persulfate (APS) initiator solution formed as 3 grams DI water per 1 gram APS. The temperature of the vessel is then allowed to increase as a result of the exothermic reaction to 175°-180° F. When the exothermic reaction has ceased, as indicated by the plateauing of the temperature within the reaction vessel, the remaining 80% of the monomer mixture is feed into the reaction vessel at a rate of 5.0 grams per minute. The polymerization reaction temperature within the vessel is maintained at 175°-180° F. Once the feed is completed, hold the vessel temperature for an additional 1 hour to ensure complete conversion.

Cross-Linked Polymer Formulation Method 1

To 100 grams of the uncross-linked polymer prepared according to the above procedure, with a composition of 22.8% BA, 29.7% Styrene, 37.5% MA, and 10% MMA, 1.8 grams of a 50% solids dispersion of zinc oxide (ZnO) having a 60 nanometer particle size in water was added. The amount of the ZnO in the dispersion added was approximately equal to one-half of the stoichiometric amount of ZnO required to react with all of the acid-functional groups present on the polymer utilized. The mixture was stirred for 1 hour at room temperature, e.g., between about 65° F. to about 85° F., or more preferably between about 70° F. to about 80° F., without the addition of any additional energy to the mixture. The resulting polymer opacity was unchanged and was free of sediment.

Cross-Linked Polymer Formulation Method 2

To 100 grams of the uncross-linked polymer prepared according to the above procedure, with a composition of 22.8% BA, 29.7% styrene, 37.5% MMA, and 10% MAA, 1.8 grams of a 50% solids slurry of powdered ZnO was added which has an average particle size of 300-400 nm. Again, the amount of the ZnO in the dispersion added was approximately equal to one-half of the stoichiometric amount of ZnO required to react with all of the acid-functional groups present on the polymer utilized. The mixture was stirred for 1 hour at room temperature without the addition of any additional energy to the mixture. The resulting polymer increased in opacity and after standing, heavy sediment developed.

The polymers formulated by methods 1 and 2 above can be utilized to formed any number of various film-forming products, and in particular can be subsequently utilized in creation of the following concentrated floor finish/polish formulations. Prior to creating the floor finish, the cross-linked polymer formulated in the second method was filtered to remove the heavy sediment created by the larger ZnO particles used in its formulation.

| Floor Finish Ingredients | |
|---|---|
| 40% solids Polymer (Methods 1 and 2) | 59.6 grams |
| 44% solids Alkali Soluble Resin | 3.4 grams |
| Ammonium Hydroxide (adjust pH to 7.9-8.4) | 0.5 grams |
| Zonyl ™ FSO | 0.1 grams |
| Tributoxy ethyl phosphate | 4.5 grams |
| 40% solids polypropylene wax emulsion | 6.4 grams |
| Pre-Mix A: | 24.5 grams |
| Water | 16.3 grams |
| dipropylene glycol monomethyl ether (DPM) | 4.9 grams |
| diethylene glycol monopropyl ether (DP) | 3.3 grams |
| Pre-Mix B: | 1.0 grams |
| Tego ® Foamex ™ 815-N | 0.1 grams |
| Water | 0.9 grams |

To form the floor polish/finish concentrate, the polymer formed by either method 1 or 2 described above is placed within a suitable mixing vessel. The alkali soluble resin is then added to the polymer mixture while the polymer mixture is agitated. Subsequently, the ammonium hydroxide is added to the mixture under vigorous stirring, and while monitoring the pH of the mixture, in order to adjust the pH of the mixture to between 7.9-8.4. Separately from these step, a Pre-Mix A is formed by mixing water, DPM and DP in the above amounts with one another. The Pre-Mix A is then added to the polymer mixture drop-wise while the polymer mixture is being stirred. The polymer mixture including the Pre-Mix A is then agitated for 30 minutes.

A Pre-Mix B is also prepared by mixing water with Foamex™ 815-N, which is added in its entirety to the polymer mixture after the 30 minutes of continuous stirring. Subsequently, the tributoxy ethyl phosphate is added to the mixture in a drop-wise manner, which is then agitated continuously for 30 minutes. The propylene wax emulsion and the Zonyl™ FSO are then added sequentially to the mixture under stirring, and the resulting mixture is allowed to stir for one hour to form the floor finish composition.

The concentrated floor finish composition resulting from the combination of these components has a Polymer/ASP/Wax ratio of 85/5/10, and a % solids by weight of 32%. The resulting concentrated floor finishes formed with the polymer of method 1 and the polymer of method 2 were then reduced in solids to 22% with water.

To evaluate the properties of the polymer compositions formed in these methods with the transition material compounds having the various sizes, four coats of the two polishes were applied at a rate of ~1000 square feet per gallon to separate black vinyl tiles. Each coat was allowed to dry 30 minutes prior to the next coat being applied. After each coat was applied the 60 and 20 degree gloss was measured using ASTM D523, with the results for the testing shown in Table 2.

TABLE 2

| Gloss measurement | Method 1 Polymer | | Method 2 Polymer | |
|---|---|---|---|---|
| | 20 degree | 60 degree | 20 degree | 60 degree |
| $2^{nd}$ Coat | 26.7 | 63.3 | 14.1 | 45.6 |
| $3^{rd}$ Coat | 48.5 | 79.4 | 25.3 | 61.8 |
| $4^{th}$ Coat | 57.2 | 82.3 | 42.1 | 71.7 |
| Recoatability/ Redispersion | Excellent (No ghosting or whitening) | | Poor (Ghosting and Whitening) | |

The above data demonstrates that the polymer formed with the zinc oxide particles less than 300 nanometers (nm), more preferably less than 150 nm, and most preferably less than 100 nm in size is unexpectedly cross-linking the acid functional groups of the polymer at the reduced reaction temperatures capable as a result of the small transition metal particle size as seen by the higher gloss reading and the excellent recoat properties.

Example 2

Comparison Study of the Average Particle Size of the ZnO Nano-Size Particles and the Rate of Reaction Monomer Mixture Preparation A suitable monomer mixture for use in forming the acid-functional polymer used to form the liquid polymer products of the present invention is prepared in a suitable mixing vessel by combining the monomers in Table 3:

TABLE 3

| Monomer | Weight (grams) | Weight Percent of Total Monomer Mixture |
|---|---|---|
| butyl acrylate | 108.0 | 30.0 |
| styrene | 94.2 | 26.0 |
| methacrylic acid | 54.0 | 15.0 |
| methyl methacrylate | 103.8 | 29.0 |

Polymer Preparation

To form the above monomer mixture into the desired acid-functional polymer, in a suitable reaction vessel equipped with a thermometer, condenser, and stirrer, a solution of 613.3 grams of deionized (DI) water, 14.4 grams of a 60% non-ylphenol ethoxylte sulfate (NPES) ammonia salt solution, and 6.0 grams of a secondary alcohol (C12-15) ethoxylate (3 moles) is formed in the vessel and heated to 150° F. Next, 20% of the above monomer mixture is added to the reaction vessel, followed by an ammonia persulfate (APS) initiator solution formed as 3 grams DI water per 1 gram APS. The temperature of the vessel is then allowed to increase as a result of the exothermic reaction to 175°-180° F. When the exothermic reaction has ceased, as indicated by the plateauing of the temperature within the reaction vessel, the remaining 80% of the monomer mixture is feed into the reaction vessel at a rate of 5.0 grams per minute. The polymerization reaction temperature within the vessel is maintained at 175°-180° F. Once the feed is completed, hold the vessel temperature for an additional 1 hour to ensure complete conversion.

Cross-Linked Polymer Formulation

To 100 grams of the uncross-linked, acid-functional polymer prepared according to the above procedure, with a composition of 30.0% BA, 26.0% styrene, 15.0% MAA, and 29.0% MMA, 2.6 grams of a 50% solids dispersion of ZnO in water were added. Three separate dispersions were formed and each was added to separate 100 gram aliquots of the acid-functional polymer, the dispersions having ZnO particles present therein in 20, 40 and 60 nanometer particle sizes, respectively. The amount of the ZnO in the dispersion added was approximately equal to one-half of the stoichiometric amount of ZnO required to react with all of the acid-functional groups present on the polymer utilized. Each mixture of the polymer and the particular ZnO dispersion was stirred for 1 hour at room temperature without the addition of any additional energy to the mixture.

Also, the pH of the mixture was continuously monitored to determine the length of time required for the pH of the mixture to stabilize, which provides evidence that the cross-linking reaction between the ZnO particles and the acid groups on the polymer to cross-link the polymer has ceased. For the purposes of this test, the time the pH of the mixture stabilized at 6.5 was noted along with the appearance of the liquid polymer, the results of which are shown in Table 4.

TABLE 4

| | ZnO Average Particle Size | | |
|---|---|---|---|
| | 20 nanometers | 40 nanometers | 60 nanometers |
| Time to stabilize at pH = 6.5 | 8 minutes | 16 minutes | 49 minutes |
| Appearance | Opacity unchanged Free of sediment | Opacity unchanged Free of sediment | Opacity unchanged Free of sediment |

The above data indicates that the rate of the cross-linking reaction between the ZnO and the acid functional groups on the polymer is a function of the average particle size of the ZnO particle.

Various additional embodiments and alternatives for the composition and method of the present invention are contemplated as being within the scope of the following claims particularly pointing out and distinctly claiming the subject matter regarded as the invention.

What is claimed is:

1. A process of producing an aqueous film-forming coating composition comprising:
   (a) charging a reaction zone with:
      1) an aqueous film-forming polymer dispersion prepared from more than one unsaturated monomer, including from about 4 to about 90 weight percent of acid-functional monomer(s), said polymer having pendant acid functionality and a calculated glass transition temperature of less than the decomposition temperature of said polymer, and
      2) less than about a stoichiometric equivalent amount, based on acid functionality of said polymer, of a water insoluble transition metal compound and having an average particle size sufficiently small to react with the polymer at a temperature approximately at or below the calculated glass transition temperature of the polymer;
   (b) maintaining the reaction zone at a temperature below the calculated glass transition temperature for the polymer for a time sufficient to react said acid and metal to produce a film-forming composition, wherein the transition metal compound has an average particle size less than 300 nm.

2. The method of claim 1 wherein the transition metal compound has an average particle size of up to 100 nm.

3. The method of claim 1 wherein the polymer is an acid-functional styrene/acrylic copolymer.

4. The method of claim 1 wherein the polymer has a glass transition temperature in the range of about 100° F. to about 200° F.

5. The method of claim 1 further comprising the step of filtering any precipitate from the composition after production.

6. The method of claim 1 wherein glass transition temperature of the polymer is above room temperature, and wherein the step of maintaining the reaction zone below the glass transition temperature for the polymer comprises maintaining the reaction zone at a temperature between the glass transition temperature for the polymer and room temperature.

7. The method of claim 1 wherein glass transition temperature of the polymer is above room temperature, and wherein the step of maintaining the reaction zone below the glass transition temperature for the polymer comprises maintaining the reaction zone at or below room temperature.

* * * * *